Figure 1:
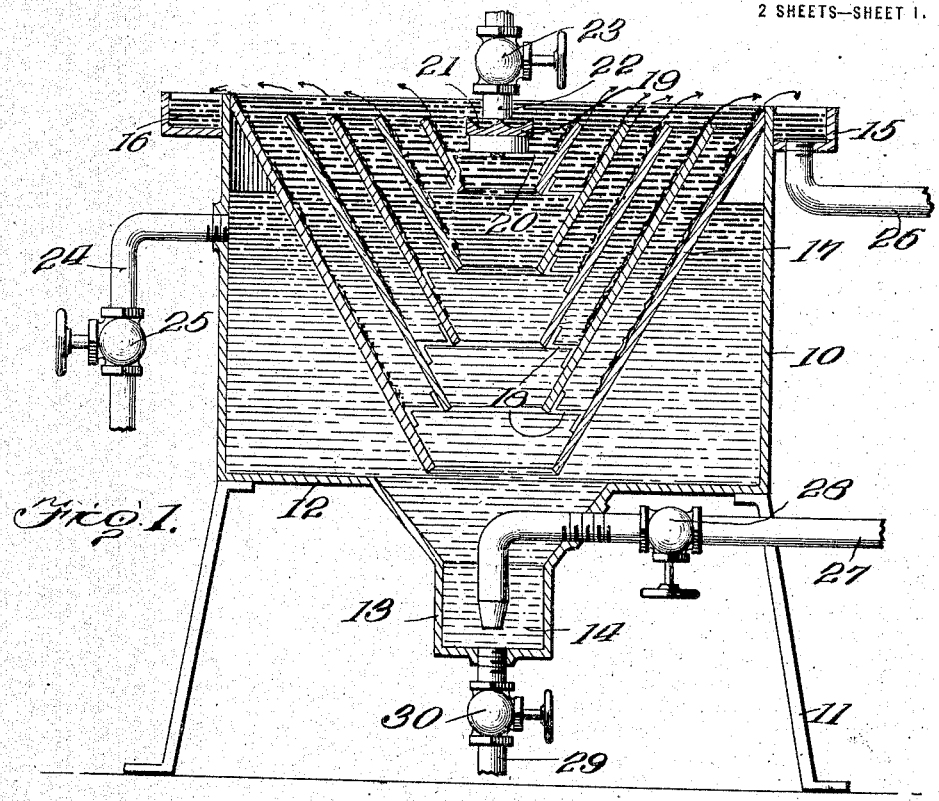

C. DE KALB.
COMBINED SETTLER AND HYDRAULIC CLASSIFIER.
APPLICATION FILED APR. 9, 1914.

1,177,849.

Patented Apr. 4, 1916.
2 SHEETS—SHEET 1.

Inventor
C. De Kalb.

Witnesses

By
Attorney

C. DE KALB.
COMBINED SETTLER AND HYDRAULIC CLASSIFIER.
APPLICATION FILED APR. 9, 1914.

1,177,849.

Patented Apr. 4, 1916.
2 SHEETS—SHEET 2.

Inventor
C. De Kalb

UNITED STATES PATENT OFFICE.

COURTENAY DE KALB, OF TUCSON, ARIZONA.

COMBINED SETTLER AND HYDRAULIC CLASSIFIER.

1,177,849. Specification of Letters Patent. Patented Apr. 4, 1916.

Application filed April 9, 1914. Serial No. 830,835.

*To all whom it may concern:*

Be it known that I, COURTENAY DE KALB, a citizen of the United States, residing at Tucson, in the county of Pima and State of Arizona, have invented certain new and useful Improvements in Combined Settlers and Hydraulic Classifiers, of which the following is a specification.

My invention relates to a new and improved apparatus for separating suspended particles of any solid matter or substance from water or other fluid holding said particles in suspension and for collecting and settling such particles in a smaller volume of fresh water or other fluid, the primary object of my invention being the provision of an apparatus peculiarly adapted to the treatment of the pulp of crushed ores, clays, chemical precipitates and the like.

A further object of my invention is to provide a separating tank or de-waterer dependent in its operation upon the rapid decrease in carrying power of a given volume of a fluid which is flowing radially from its source and the velocity of which is consequently constantly diminished.

Another object of my invention is to render the separation, upon the above principle, of solid matter from the suspending fluid more rapid and complete by the provision of a structure which will prevent the formation of eddies, cross currents, convection currents and all other induced currents or agitations in the collecting fluid which, if set up, would interfere with the efficacious and complete separation of the solid matter from the pulp. And a still further object which I have in mind is the provision of an apparatus for separating and sorting the solid particles from ore pulps and the like into varying grades of fineness or of varying grades of relative mass, and which will be as effective for one use as the other.

These objects, together with various minor objects, will be clearly brought out in the following description of the apparatus which more fully sets forth my invention, in the drawings which illustrate its preferred embodiment, and in the claims which are attached to and form a part of this application.

Figure 2:
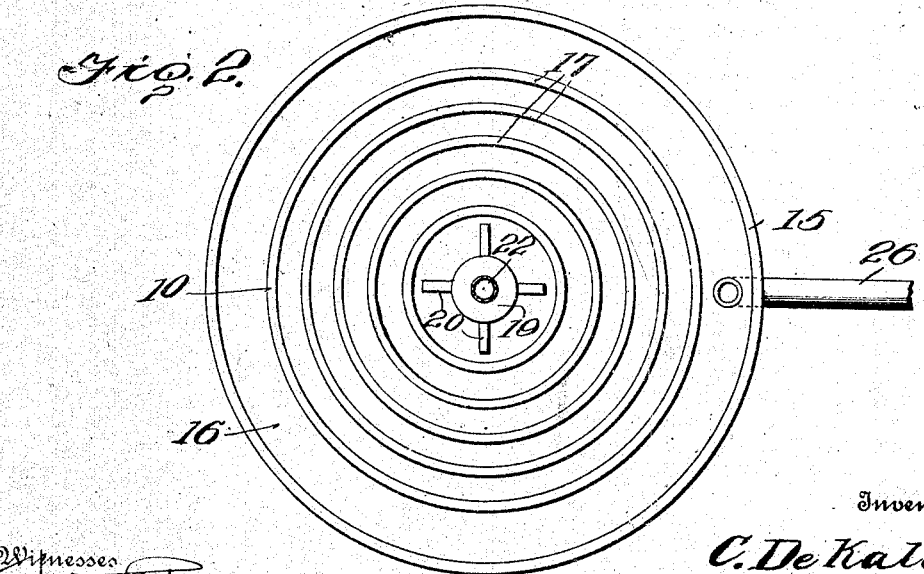
Figure 3:
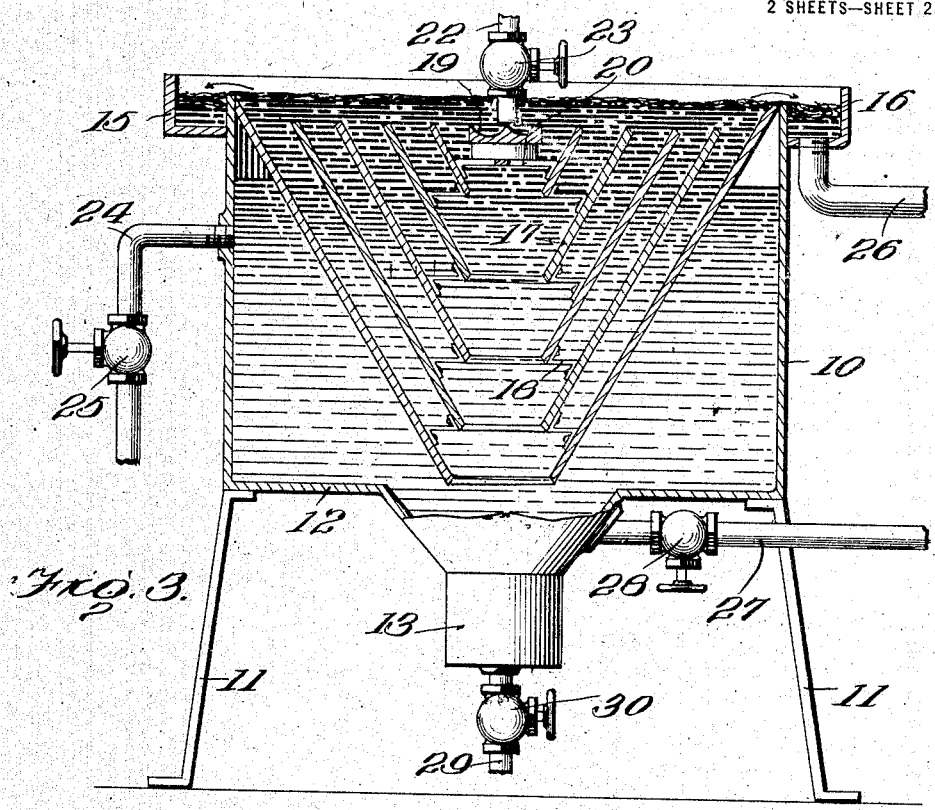
Figure 4:
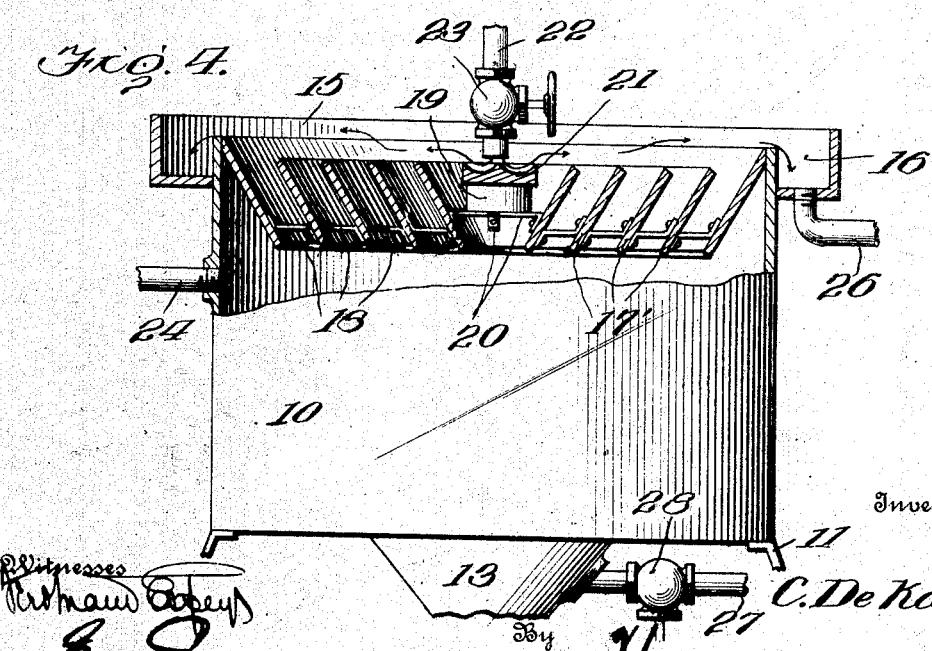

In the drawings:—Figure 1 is a central vertical sectional view of the settling tank or de-waterer forming my invention, showing its use in separating suspended particles from a fluid; Fig. 2 is a top plan view of the tank; Fig. 3 is a view similar to that shown in Fig. 1, but illustrating the use of the apparatus as a hydraulic classifier; Fig. 4 is a fragmentary sectional view similar to that shown in Figs. 1 and 3, showing a slightly modified form of construction.

Corresponding and like parts are referred to in the following description and indicated in all the views of the drawings by the same reference characters.

The apparatus constituting my invention primarily includes a settling tank 10 open at its upper end and surrounded by a launder, a centrally positioned pulp supply pipe discharging upon a feed sole or deflector plate mounted slightly below the level of the top of the tank and a plurality of baffle walls concentrically arranged about the sole with their upper ends on a level with the lip of the sole, the function of these baffle walls being to prevent the formation of currents in the fluid contained in the tank.

The tank 10, which may be made in any suitable size, is supported upon legs 11. This tank is formed of sheet metal, wood, waterproof wood pulp or other material suited to the use to which the apparatus is to be put and is preferably circular in horizontal section although it may be elliptical, polygonal, square or triangular, if, for any reason, such a shape is deemed advisable. This tank is open at its upper end and closed at its lower end by a bottom 12 usually provided centrally with a downwardly directed, preferably funnel-shaped extension 13, forming an accumulator 14 in which the separated matter settles. Encircling the upper portion of this tank and formed integrally therewith or otherwise secured thereto, as convenient, is an outwardly and upwardly directed flange 15 coacting with the tank to provide an annular overflow trough or launder 16.

Concentrically arranged within the above described tank are a plurality of walls 17 forming funnel-shaped baffle members which are preferably equally spaced from each other, the annular walls forming these baffle members being inclined inwardly and downwardly at a common angle to the axis of the tank. The outermost of these walls or baffle members is secured along its upper edge to the top edge of the tank in such a way as to prevent the passage of fluid between the two and each successive wall is supported by brackets 18 extending between it and the next adjacent outer wall. As the sole distinction between the construction illustrated in Fig. 1 and that illustrated in Fig. 4, resides in the construction of these walls or baffle members, that distinction may well be made clear at this point. In both instances, the upper ends of all the baffle members, save the outermost, terminate in a common plane parallel to and slightly below the plane of the top of the tank, while the outer baffle member, in each case, terminates at the top of the tank to which it is attached. As clearly shown in Fig. 1, the lower ends of the baffle members, in that form of my invention, terminate in planes parallel to that of the upper ends but spaced from each other in such a manner that the lower edges of said members form a series of circles plotting either a geometric right cylinder or a frustum of a cone, the axis of which coincides with the axis of the tank. On the other hand, the baffle members 17', as shown in Fig. 4, all terminate at their lower ends in a common plane parallel to the plane of their upper ends. As primarily noted, the function of these baffle members 17 and 17' is to prevent the setting up of undesirable currents in the fluid contained in the tank and either form is equally as effective for this purpose when the apparatus is used as a de-waterer or settler. The form shown in Fig. 1 is however, far superior to that shown in Fig. 4 when the apparatus is used as a hydraulic classifier as will be later explained and for that reason I greatly prefer this form.

Returning now to the general description of my invention, it will be noted that the feed sole or deflector plate, here designated by the numeral 19, is supported centrally within the innermost of the baffle members by brackets 20 in such a manner that its upper face is on a level with the upper end of said baffle member. This feed sole is circular in plan and its upper face is provided with an annular channel arcuate in section as shown at 21, or otherwise shaped, to discharge pulp fed to its central portion radially and upwardly throughout its entire circumference.

A pulp supply pipe 22, provided with any suitable cut-off valve 23, has its vertical discharge terminal directed downwardly and positioned in slightly spaced relation above the center of this feed sole to supply the pulp thereto. Hydraulic water may be supplied to the tank through a water supply pipe 24 leading into the tank near its upper end and having a cut-off valve 25, while all fluid discharged into the launder may be conducted away by a pipe 26 leading from the bottom thereof.

Although the above described parts are all that are essential to the effective operation of the apparatus, both as a separator and as a hydraulic classifier, I preferably provide a flush pipe 27 leading the same through a nozzle, or otherwise, into the accumulator 14, as shown, the flow of water through this pipe being governed by a valve 28. By this means, the solid matter gathered in the accumulator may be flushed out through a pipe 29 leading from the bottom of the accumulator and having a valve 30. It must be noted however, that these latter parts are considered as an accessory and not as essential to the successful and effective operation of the device and are merely indicated as one mechanical means for discharging the accumulated solid matter as this result may be readily accomplished by any one of a number of convenient and well known methods.

Anyone skilled in the use of separators and hydraulic classifiers will readily understand the operation of my improved apparatus either as a separator or a classifier and but little description of its employment for either purpose is therefore necessary. When used as a separator, the valves 28 and 30 are closed and the tank filled with water by opening the valve 25, this valve being again closed as soon as the tank is filled. The valve 23 is then opened to permit the uniform feeding of the proper amount of ore, clay or other pulp to be treated, to the feed sole from which it is deflected in all directions over the surface of the water in the tank. The outward radial velocity of a fluid distributed and flowing in this manner decreases in proportion to the distance from its source of supply and as the carrying power of the fluid varies approximately as the fifth power of its velocity it will be apparent that a slight decrease in velocity will cause any solid particles to be rapidly precipitated out of the fluid. Such an operation in an ordinary tank is ineffective, however, due to the setting up of eddies, cross currents and the like in the water contained in the tank which prevent the settling of the solid particles and cause them to pass out with the water flowing over the top of the tank to the launder. With my apparatus, however, the solid matter, which when separated from the fluid of the pulp tends to settle, has but a very short distance to fall before it reaches the inclined inner faces of the baffle members where it is adequately protected from all currents. The solid matter, upon reaching the baffle walls, slides or rolls down the walls displacing fresh water in the tank as it sinks, this water rising through the central column between the lower ends of the baffle members. As this current is produced by the sinking of the solid matter and by that alone, it does not have the power to lift the solid matter which produced it and the latter is therefore protected from being carried upward and into the outward circulation of the superficial current. By this means practically all of the solid matter contained in the pulp may be separated out, the liquid from which it has been removed overflowing into the launder. The solid matter settles in the accumulator and may be removed by flushing or by any other suitable means.

The operation of the apparatus as a hydraulic classifier is similar to the above described operation, with the exception that the valve 25 is kept open to supply sufficient fresh water for the necessary overpressure, commonly known as "hydraulic water". The upward current of this hydraulic water lifts the lighter particles and carries them over into the launder, the weight of the particles so removed being regulated by the rate of flow of hydraulic water into the tank. Upon filling the tank, air is compressed between the upper portions of the tank and outermost baffle member and this compressed air serves as a cushion to equalize any slight variations in pressure of the water supplied through the pipe 24.

Any number of baffle members may be employed and the inclination of their walls varied to suit conditions. An inclination of approximately sixty degrees from the horizontal has, however, been found, from actual experience, to be most effective under ordinary circumstances. Preferably, the baffle members are spaced about four inches apart and with their upper ends about one inch below the surface of the liquid in the tank, but I do not wish to, in any way, limit myself to any specified number or inclination of baffles or any fixed spacing of the same either with respect to each other or to the surface of the water. In other words, it will be understood that I reserve the right to make any changes whatever, within the scope of the appended claims, without in the slightest degree departing from the spirit of my invention.

Having thus described the invention, what is claimed as new is:

1. In an apparatus of the class described, a tank open at its upper end, a plurality of concentrically arranged baffle members positioned within the tank, and a feed sole having a concavity in its upper face centrally supported in the upper end of the tank with its upper peripheral edge in the plane of the upper edge of an adjacent baffle member.

2. In an apparatus of the class described, a settling tank open for overflow discharge, a plurality of concentrically arranged baffle members mounted in spaced relation in the tank with their upper ends spaced slightly below the top of the tank, and a feed sole mounted in the tank with its upper face on a level with the upper ends of the baffle members.

3. In an apparatus of the class described, a settling tank open for overflow discharge, a funnel-shaped baffle member secured by its larger end to the upper end of the tank and with its smaller end spaced above the bottom of the tank, a plurality of similar baffle members concentrically arranged within the first and with their upper ends in a common plane slightly below the top of the tank, and a feed sole supported by the innermost of said baffle members.

4. In an apparatus of the class described, a settling tank open for overflow discharge, a funnel-shaped baffle member secured by its larger end to the upper end of the tank and with its smaller end spaced above the bottom of the tank, a plurality of similar baffle members concentrically arranged within the first and with their upper ends in a common plane slightly below the top of the tank, a feed sole supported by the innermost of said baffle members, and a pulp supply pipe arranged to discharge on the feed sole.

5. In an apparatus of the class described, a tank open at its upper end, a plurality of concentrically arranged spaced apart funnel-shaped baffle members supported in the tank with their upper ends adjacent to the upper end of the tank, and means for discharging pulp laterally over the upper ends of said baffle members.

6. In an apparatus of the class described, a settling tank open at its upper end for overflow discharge and closed at its lower end by an accumulator, a feed sole centrally supported in the upper end of the tank and slightly below the surface when the tank is filled with a fluid, said feed sole being provided in its upper face with an annular channel arcuate in section, and a plurality of baffle members concentrically arranged about the feed sole with their upper edges substantially in the plane thereof.

7. In an apparatus of the class described, a tank open at its upper end, a funnel-shaped baffle member secured by its larger end to the upper edge of the tank and with its smaller end spaced above the bottom of the tank, means for supplying water under pressure to the tank above the level of the smaller end of said baffle member, and a plurality of funnel-shaped baffle members concentrically arranged within the first baffle member.

8. In an apparatus of the class described, a tank open for overflow discharge, means for filling the tank with a fluid, means for radially distributing pulp over the surface of the fluid contained in the tank, and a plurality of concentrically arranged baffle members positioned in the tank with their upper ends slightly below the surface.

9. In an apparatus of the class described, a tank open for overflow discharge, means for filling the tank with a fluid, means for radially distributing pulp over the surface of the fluid contained in the tank, and a plurality of concentrically arranged baffle members positioned in the tank with their upper ends slightly below the surface, the opposite end of each baffle member extending to a lower level than the corresponding end of the baffle member which it encircles.

10. In an apparatus of the class described, a tank, a funnel-shaped baffle member secured by its larger end to the upper edge of the tank and with its smaller end spaced above the bottom of the tank, a feed sole disposed centrally in the upper end of the tank, means for admitting liquid under pressure to the tank at a level intermediate the ends of the baffle member, whereby a water sealed air chamber is provided between the wall of the tank and the upper portion of the baffle member, and a plurality of additional, spaced baffle members concentrically disposed within the first baffle member.

11. In an apparatus of the class described, a tank, a funnel-shaped baffle member secured by its larger end to the upper edge of the tank and with its smaller end spaced above the bottom of the tank, means for admitting liquid under pressure to the tank at a level intermediate the ends of the baffle member, whereby a water sealed air chamber is provided between the wall of the tank and the upper portion of the baffle member, and a plurality of additional, spaced baffle members concentrically disposed within the first baffle member, the upper edges of the latter baffle members lying in a common plane below the level of the upper edge of the tank.

12. In an apparatus of the class described, a tank, a funnel-shaped baffle member secured by its larger end to the upper edge of the tank and with its smaller end spaced above the bottom of the tank, means for admitting liquid under pressure to the tank at a level intermediate the ends of the baffle member, whereby a water sealed air chamber is provided between the wall of the tank and the upper portion of the baffle member, a plurality of additional, spaced baffle members concentrically disposed within the first baffle member, the upper edges of the latter baffle members lying in a common plane below the level of the upper edge of the tank, and a feed sole positioned centrally of the inner baffle member and at the level of the upper edges of the baffle members.

13. In an apparatus of the class described, a tank open at its upper end, a funnel-shaped baffle member secured by its larger end to the upper edge of the tank and with its smaller end spaced above the bottom of the tank, means for supplying water under pressure to the tank above the level of the smaller end of said baffle member, and a feed sole disposed centrally of the tank with its upper face in substantially the plane of the upper edge of the tank and baffle member, whereby pulp supplied to the sole will be distributed radially in the upper stratum of liquid filling the tank.

14. In an apparatus of the class described, a tank, a funnel-shaped baffle member secured by its larger end to the upper edge of the tank and with its smaller end spaced above the bottom of the tank, means for admitting liquid under pressure to the tank at a level intermediate the ends of the baffle member, whereby a liquid sealed air chamber is provided between the wall of the tank and the upper portion of the baffle member, and a feed sole disposed centrally in the upper end of the tank with its upper face slightly below the level of liquid in the tank when such liquid is overflowing the edge of the tank.

In testimony whereof I affix my signature in presence of two witnesses.

COURTENAY DE KALB. [L. S.]

Witnesses:
P. E. BAFFERT,
J. O. DOWD.